United States Patent
Kuwayama et al.

(10) Patent No.: US 9,368,813 B2
(45) Date of Patent: Jun. 14, 2016

(54) DRAINAGE STRUCTURE FOR GAS OUTLET REGION IN FUEL CELL STACK

(71) Applicant: HONDA MOTOR CO., LTD., Tokyo (JP)

(72) Inventors: Takashi Kuwayama, Utsunomiya (JP); Kazuya Sasamoto, Haga-gun (JP); Mitsunori Matsumoto, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/405,266

(22) PCT Filed: Jun. 3, 2013

(86) PCT No.: PCT/JP2013/065391
§ 371 (c)(1),
(2) Date: Dec. 3, 2014

(87) PCT Pub. No.: WO2013/183598
PCT Pub. Date: Dec. 12, 2013

(65) Prior Publication Data
US 2015/0125775 A1 May 7, 2015

(30) Foreign Application Priority Data
Jun. 4, 2012 (JP) .................................. 2012-126960

(51) Int. Cl.
*H01M 8/24* (2016.01)
*H01M 8/04* (2016.01)
(Continued)

(52) U.S. Cl.
CPC ........... *H01M 8/04089* (2013.01); *F16L 55/00* (2013.01); *H01M 8/04* (2013.01);
(Continued)

(58) Field of Classification Search
None
See application file for complete search history.

(56) References Cited

U.S. PATENT DOCUMENTS

2003/0183374 A1* 10/2003 Voss .................... B01D 5/0015
165/110
2009/0023019 A1* 1/2009 Koenekamp ...... H01M 8/04141
429/410

(Continued)

FOREIGN PATENT DOCUMENTS

CN         1551395 A    12/2004
CN       101300702 A    11/2008

(Continued)

OTHER PUBLICATIONS

International Search Report dated Aug. 6, 2013 corresponding to International Patent Application No. PCT/JP2013/065391 and English translation thereof.

(Continued)

*Primary Examiner* — Patrick Ryan
*Assistant Examiner* — Jose Colucci Rios
(74) *Attorney, Agent, or Firm* — Squire Patton Boggs (US) LLP

(57) ABSTRACT

A fuel cell stack includes a laminated body in which a plurality of electricity generation cells are laminated and is provided with a reaction gas discharge through hole which discharges a reaction gas used in an electricity generation reaction. An end plate is arranged at one end in the lamination direction of the laminated body and is provided with a reaction gas outlet which communicates with the reaction gas discharge through hole. A drainage structure has an outlet pipe coupled to the reaction gas outlet. A tip end portion of the outlet pipe on the downstream side in the reaction gas discharge flow direction opens downward. Umbrella-shaped protrusion portions are provided within the outlet pipe. These protrusion portions have a shape which tapers toward the upstream side with respect to the reaction gas discharge flow direction, dividing the continuous flow of the discharged liquid and the reaction gas.

9 Claims, 11 Drawing Sheets

(51) Int. Cl.
  *F16L 55/00* (2006.01)
  *H01M 8/06* (2016.01)
  *H01M 8/10* (2016.01)

(52) U.S. Cl.
  CPC ............ *H01M8/04164* (2013.01); *H01M 8/06* (2013.01); *H01M 8/10* (2013.01); *H01M 8/24* (2013.01); *H01M 8/2465* (2013.01); *H01M 2250/20* (2013.01); *Y02E 60/50* (2013.01); *Y02T 90/32* (2013.01)

(56) References Cited

U.S. PATENT DOCUMENTS

2009/0136823 A1* 5/2009 Kusakabe ........... H01M 8/0263 429/434
2012/0270120 A1* 10/2012 Kim ................. H01M 8/04141 429/413

FOREIGN PATENT DOCUMENTS

| | | |
|---|---|---|
| JP | 2-148083 U | 12/1990 |
| JP | 09-283157 A | 10/1997 |
| JP | 2005-332674 A | 12/2005 |
| JP | 2006-339078 A | 12/2006 |
| JP | 2008-159472 A | 7/2008 |
| JP | 2010-003603 A | 1/2010 |
| JP | 2011-034868 A | 2/2011 |
| WO | 2011/122822 A2 | 10/2011 |
| WO | 2012/007989 A1 | 1/2012 |

OTHER PUBLICATIONS

Office Action dated Mar. 18, 2016, issued in corresponding CN Application No. 201380029326.0 (with English translation).

* cited by examiner

DRAINAGE STRUCTURE FOR GAS OUTLET REGION IN FUEL CELL STACK

TECHNICAL FIELD

The present invention relates to a drainage structure for a gas outlet region in a fuel cell stack.

Priority is claimed on Japanese Patent Application No. 2012-126960, filed Jun. 4, 2012, the contents of which are incorporated herein by reference.

BACKGROUND ART

Heretofore, in order to prevent an electrical short circuit (liquid junction) between an electrical activation unit of a fuel cell stack and an external low electrical resistance member (such as a metal member) via generated water, which is generated in the fuel cell stack, there has been considered countermeasures for electrical short circuit in a fuel cell stack, in particular, in a gas outlet region thereof including respective members around a reaction gas outlet. For example, there is known a fuel cell system in which a discharge pipe connected to a reaction gas discharge through hole of a fuel cell stack, is formed with an electrically insulating member (for example, refer to Patent Document 1).

However, according to this fuel cell system, if the discharge pipe is formed long and insulation resistance is increased, the strength of the discharge pipe may be reduced in some cases, and there is a problem in that the arrangement of the discharge pipe becomes complex and the size of the piping structure becomes large.

In response to this type of problem, there has conventionally been known a fuel cell stack in which, for example, the tip end of an outlet pipe connected to a fuel gas discharge through hole of the fuel cell stack is accommodated in the interior thereof, and there is provided a water collection tank for accumulating generated water discharged from the tip end of this outlet pipe (for example, refer to Patent Document 2).

This fuel cell stack is of a configuration such that the highest water level of generated water, which drips from the tip end of the outlet pipe and which is accumulated in the water collection tank, is distanced vertically downward from the tip end of the outlet pipe by just a predetermined distance, and thereby, conductive paths, which may be formed by generated water, are blocked.

DOCUMENTS OF RELATED ART

Patent Documents

[Patent Document 1] Japanese Unexamined Patent Application, First Publication No. 2005-332674
[Patent Document 2] Japanese Unexamined Patent Application, First Publication No. 2010-3603

SUMMARY OF INVENTION

Problems to be Solved by the Invention

According to the fuel cell stack of the above conventional technique, the direction of discharging generated water that is discharged together with reaction gas from the outlet pipe is not limited to the vertically downward direction, and it changes according to the flow rate of reaction gas.

For example, whereas generated water drips vertically downward when the flow rate of the reaction gas is low, generated water is discharged in the extending direction of the outlet pipe when the flow rate of the reaction gas becomes moderate, and generated water is discharged toward the radially outer circumferential side when the flow rate of the reaction gas becomes higher.

Accordingly, it is necessary to ensure a desired spatial distance to the inner wall plane of the water collection tank in various directions from the tip end of the outlet pipe, and there is a problem in that the water collection tank and the housing that accommodates the water collection tank become larger.

Aspects of the present invention take into consideration the above circumstances, with an object of providing a drainage structure for a gas outlet region in a fuel cell stack capable of preventing conductive paths from being formed by liquid discharged from the fuel cell stack between an electrical activation unit of the fuel cell stack and an external low electrical resistance member.

Means for Solving the Problem

The present invention employs the following aspects in order to solve the above problem and achieve the object.

(1) A drainage structure for a gas outlet region in a fuel cell stack of an aspect of the present invention is a drainage structure for a gas outlet region in a fuel cell stack, the fuel cell stack comprising: a laminated body in which a plurality of electricity generation cells are laminated, and that is provided with a reaction gas discharge through hole which discharges a reaction gas used in an electricity generation reaction in the electricity generation cells; and an end plate arranged at one end in the lamination direction of the laminated body and provided with a reaction gas outlet which communicates with the reaction gas discharge through hole. The drainage structure has an outlet pipe coupled to the reaction gas outlet, with a tip end portion of the outlet pipe on a downstream side in a reaction gas discharge flow direction opening downward. At least one umbrella-shaped protrusion portion is provided within the outlet pipe, and the protrusion portion has a shape which tapers toward an upstream side with respect to the reaction gas discharge flow direction, thereby dividing a continuous flow of the discharged liquid as well as the reaction gas.

(2) In the aspect (1) above, a plurality of the umbrella-shaped protrusion portions may be arranged in a staggered manner within the outlet pipe.

(3) In the aspect (2) above, the umbrella-shaped protrusion portions may be formed in a shape which protrudes in an upstream direction of the outlet pipe, and may be formed in a shape which protrudes toward a radially inner side of the outlet pipe.

(4) In the aspect of either one of (2) and (3) above, between upstream side umbrella-shaped protrusion portions and downstream side umbrella-shaped protrusion portions, which are arranged in the staggered manner, there may be provided a discharged liquid guide portion which has a wall portion along a substantially radial direction of the outlet pipe.

(5) In the aspect of any one of (2) through (4) above, a portion of an opening portion of the outlet pipe, with which a lower end of the umbrella-shaped protrusion portion is in contact, between one lower end and an other lower end of the umbrella-shaped protrusion portion may be formed in a manner of being a cutaway toward the tapered portion of the umbrella-shaped protrusion portion.

(6) In the aspect of any one of (2) through (5) above, a lower end of the umbrella-shaped protrusion portion may be inclined with respect to a radial direction of the outlet pipe.

(7) In the aspect of any one of (1) through (6) above, there may be provided a catch tank which receives liquid discharged from the outlet pipe, the outlet pipe may have the tip end portion projecting within the catch tank, and a predetermined clearance may be provided respectively from an inner side plane and an inner bottom plane of the catch tank.

(8) In the aspect of any one of (1) through (7) above, the umbrella-shaped protrusion portion may be such that an angle of a tapered portion on the upstream side with respect to the reaction gas discharge flow direction is approximately 90 degrees.

(9) In the aspect of any one of (1) through (8) above, the tip end portion of the outlet pipe may be formed in a tapered shape.

Advantage of Invention

According to the aspect of (1) above, at least one umbrella-shaped protrusion portion of a shape tapered toward the upstream side with respect to the reaction gas discharge flow direction that is provided in the outlet pipe, divides a continuous flow of the liquid discharged together with the reaction gas, and in addition, the tip end portion of the outlet pipe opens downward. As a result, the divided liquid can be stably discharged downward regardless of the flow rate of the reaction gas. Therefore, without increasing the distance between the outlet pipe and the external low electrical resistance member, it is possible to prevent an electrical short circuit, via this liquid, between the electrical activation unit of the fuel cell stack and the external low electrical resistance member. In addition, since the umbrella-shaped protrusion portions within the outlet pipe divide a continuous flow of a liquid, the configuration for dividing a liquid continuous flow will not become large. As a result, while preventing the configuration from becoming large, it is possible to prevent conductive paths from being formed by the liquid discharged from the fuel cell stack, between the electrical activation unit of the fuel cell stack and the external low electrical resistance member.

In the case of (2) through (6) above, since a plurality of the umbrella-shaped protrusion portions are arranged in a staggered manner within the outlet pipe, it is possible to divide a large amount of the liquid that is discharged together with the reaction gas, and it is possible to divide a liquid continuous flow in a satisfactory manner. Therefore, it is possible to further prevent the electrical activation unit of the fuel cell stack and the external low electrical resistance member from being short circuited via the liquid discharged from the fuel cell stack.

In the case of (7) above, since the tip end portion of the outlet pipe projects into the catch tank, it is possible, with an effect of the umbrella-shaped protrusion portions dividing a liquid continuous flow as well as the tip end portion of the outlet pipe opening downward, to prevent the electrical activation unit of the fuel cell stack and the catch tank from being electrically short circuited via the liquid, without increasing the distance respectively between the tip end portion of this outlet pipe, and the inner side plane and the inner bottom plane of the catch tank. Therefore, it is possible to suppress an increase in the size of the catch tank.

In the case of (8) above, since the angle of the tapered portion of the umbrella-shaped protrusion portion on the upstream side with respect to the reaction gas discharge flow direction is approximately 90 degrees, it is possible to suppress the liquid discharged from the fuel cell stack from over flowing and crossing over the umbrella-shaped protrusion toward the radially inner side, and thus perform flow division in a satisfactory manner. Moreover, it is possible to suppress the divided liquid from re-merging after crossing over the umbrella-shaped protrusion portion toward the downstream side with respect to the reaction gas discharge flow direction. Therefore, it is possible to further prevent the electrical activation unit of the fuel cell stack and the external low electrical resistance member from being short circuited via the liquid discharged from the fuel cell stack.

In the case of (9) above, since the tip end portion of the outlet pipe on the downstream side with respect to the reaction gas discharge flow direction is formed in a tapered shape, it is possible to suppress the liquid discharged from the fuel cell stack from merging at the position of this tip end portion and becoming a continuous flow again. Therefore, it is possible to further prevent the electrical activation unit of the fuel cell stack and the external low electrical resistance member from being short circuited via the liquid discharged from the fuel cell stack.

DESCRIPTION OF THE EMBODIMENTS

Hereunder, the drainage structure for a gas outlet region in a fuel cell stack according to one embodiment of the present invention is described, with reference to the accompanying drawings.

Figure 1:
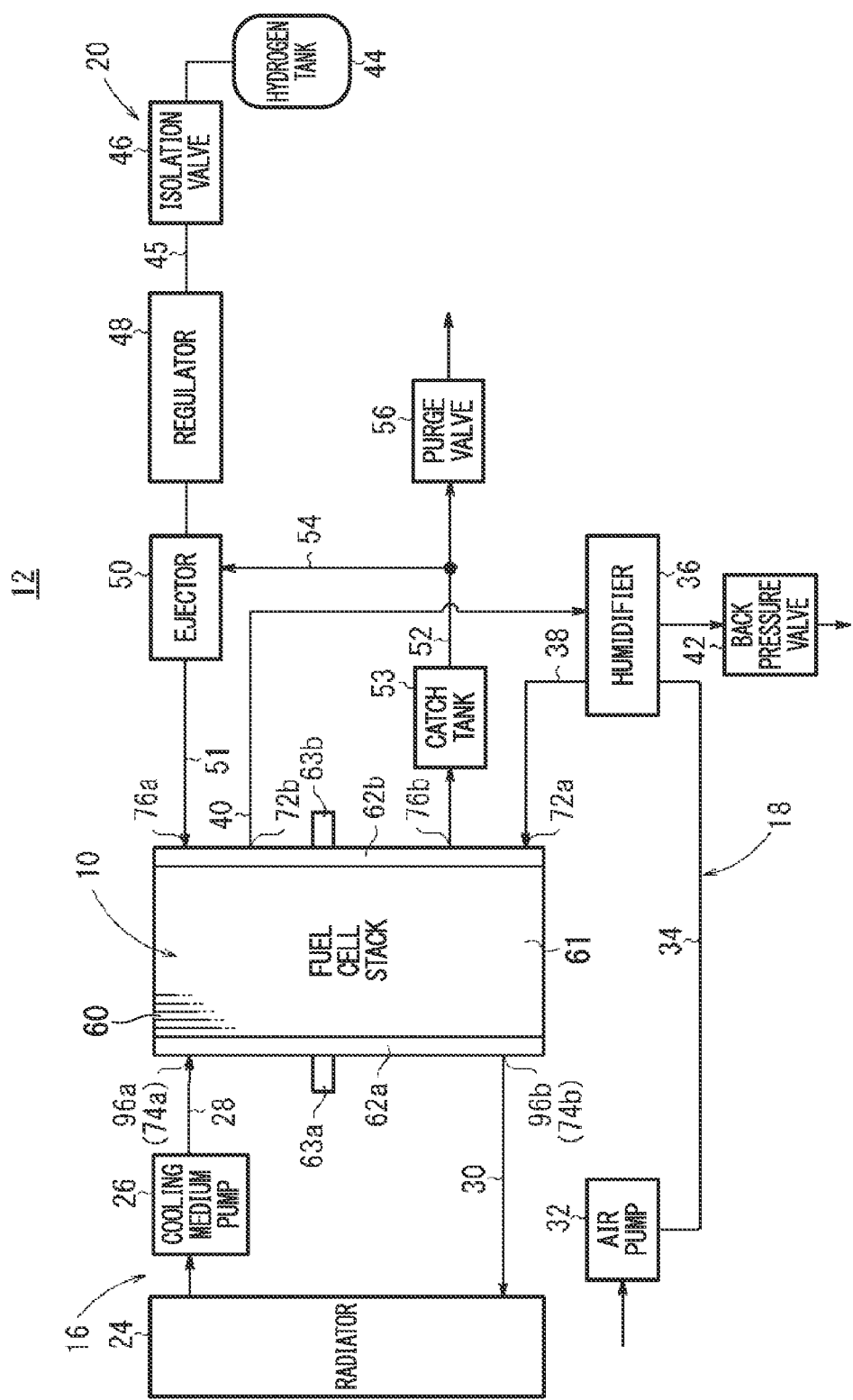
FIG. 1 is a schematic configuration diagram of a fuel cell system which employs a drainage structure for a gas outlet region in a fuel cell stack according to an embodiment of the present invention.

FIG. 1 is a schematic configuration diagram of a fuel cell system 12 which employs the drainage structure for a gas outlet region in a fuel cell stack 10 according to the present embodiment.

The fuel cell system 12 is to be mounted on a fuel cell vehicle (not shown in the figure), and it is provided with a fuel cell stack 10, a cooling medium supply mechanism 16 for supplying a cooling medium to the fuel cell stack 10, an oxidant gas supply mechanism 18 for supplying an oxidant gas (reaction gas) to the fuel cell stack 10, and a fuel gas supply mechanism 20 for supplying a fuel gas (reaction gas) to the fuel cell stack 10.

The cooling medium supply mechanism 16 is provided with a radiator 24. To this radiator 24 there is connected, from one side, a cooling medium supply pipe 28 via a cooling medium pump 26, and there is connected, from the other side, a cooling medium discharge pipe 30.

The oxidant gas supply mechanism 18 is provided with an air pump 32, and to this air pump 32 there is connected one end of an air supply pipe 34. The other end of this air supply pipe 34 is connected to a humidifier 36, and this humidifier 36 is connected to the fuel cell stack 10 via a humidification air supply pipe 38.

To the fuel cell stack 10 and the humidifier 36 there is connected an off-gas supply pipe 40 for supplying used oxidant gas (hereunder, referred to as off-gas) containing generated water as a humidification fluid. At the humidifier 36, on the side that discharges the off-gas supplied via the off-gas supply pipe 40, there is arranged a back pressure valve 42.

The fuel gas supply mechanism 20 is provided with a fuel gas tank 44 which accumulates hydrogen gas as a fuel gas. To this fuel gas tank 44 there is connected one end of the fuel gas pipe 45, and to this fuel gas pipe 45 there is connected a fuel gas supply pipe 51 via an isolation valve 46, a regulator 48, and an ejector 50. This fuel gas supply pipe 51 is connected to the fuel cell stack 10.

To the fuel cell stack 10 there is connected via a catch tank 53, a discharged fuel gas pipe 52, through which used fuel gas is discharged. This discharged fuel gas pipe 52 is connected to the ejector 50 via a return pipe 54, and forms a fuel gas circulation system (reaction gas circulation system), while a part thereof communicates with a purge valve 56.

The fuel cell stack 10 has a laminated body 61 in which a plurality of electricity generation cells 60 are laminated in the horizontal direction (direction of the arrow A in FIG. 2 and FIG. 3), which is a vehicle lengthwise direction, and at both end portions of the laminated body 61 with respect to the lamination direction, there are arranged metal end plates 62a and 62b via a terminal plate and an insulation plate (not shown in the figure) (refer to FIG. 1). Electric power output terminals 63a and 63b project outward in the lamination direction from the end plates 62a and 62b, and these electric power output terminals 63a and 63b are connected to a vehicle propulsion motor and auxiliary devices (not shown in the figure).

Figure 2:
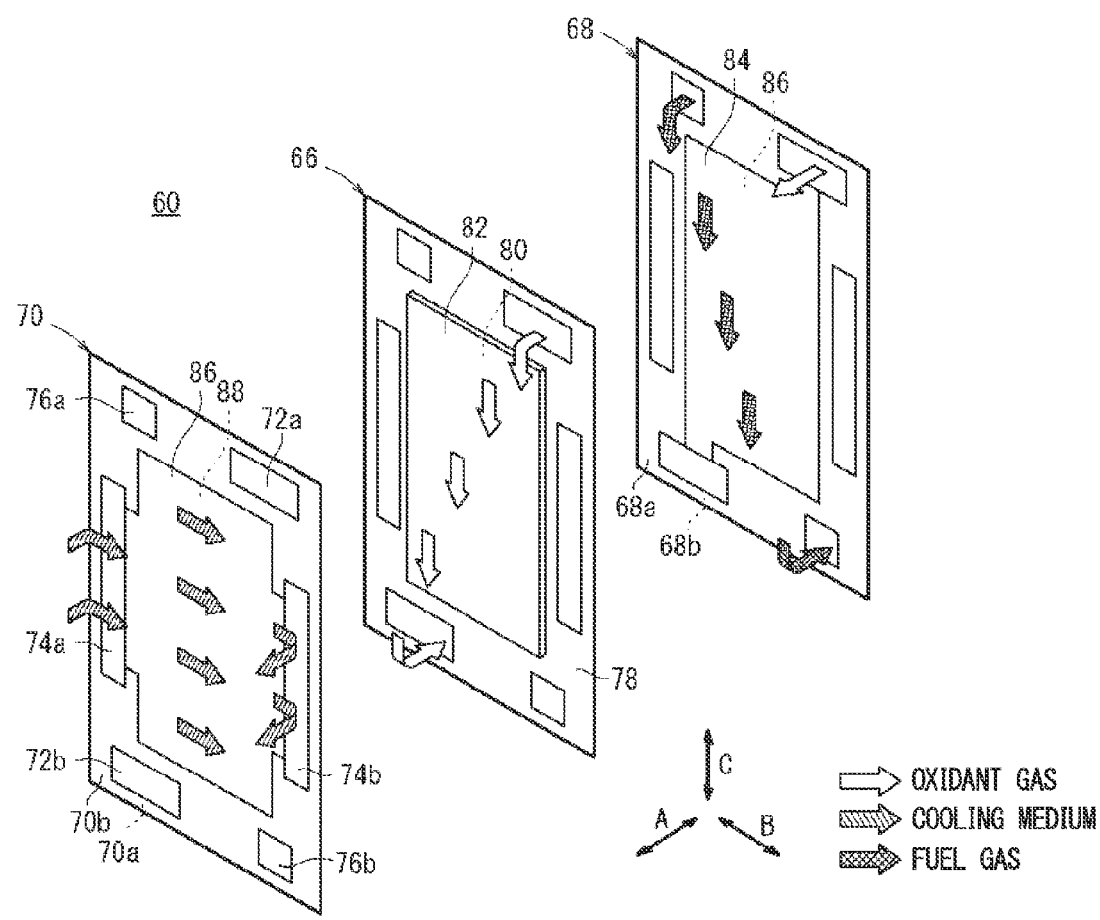
FIG. 2 is an exploded perspective view of an electricity generation cell which constitutes the fuel cell stack.

As shown in FIG. 2, each electricity generation cell 60 is provided with an electrolyte membrane-electrode structure 66, and a first separator 68 and second separator 70 which sandwich the electrolyte membrane-electrode structure 66, and it is of a vertically long configuration. Furthermore, the first separator 68 and the second separator 70 are configured with a carbon separator or a metal separator.

In one edge portion (upper edge portion) of the electricity generation cell 60 with respect to the long side direction (direction of the arrow C), there are provided; an oxidant gas supply through hole 72a for supplying an oxidant gas, which is a reaction gas used in the electricity generation reaction in the electricity generation cell 60, such as oxygen-containing gas, and a fuel gas supply through hole 76a for supplying a fuel gas, which is a reaction gas used in the electricity generation reaction in the electricity generation cell 60, such as hydrogen-containing gas, which communicate with each other in the arrow A direction.

In the other edge portion (lower edge portion) of the electricity generation cell 60 with respect to the long side direction, there are provided; an oxidant gas discharge through hole 72b for discharging the oxidant gas, which is the reaction gas used in the electricity generation reaction in the electricity generation cell 60, and a fuel gas discharge through hole (reaction gas discharge through hole) 76b for discharging the fuel gas, which is the reaction gas used in the electricity generation reaction in the electricity generation cell 60, which communicate with each other in the arrow A direction.

In one edge portion of the electricity generation cell 60 with respect to the short side direction (direction of the arrow B), there is provided a cooling medium supply through hole 74a for supplying a cooling medium, and in the other edge portion of the electricity generation cell 60 with respect to the short side direction, there is provided a cooling medium discharge through hole 74b for discharging the cooling medium. The cooling medium supply through hole 74a and the cooling medium discharge through hole 74b are set to a vertically long shape.

For example, the electrolyte membrane-electrode structure 66 is provided with a solid polymer electrolyte membrane 78, in which a thin perfluorosulfonic acid membrane is impregnated with water, and an anode side electrode 80 and a cathode side electrode 82 which sandwich the solid polymer electrolyte membrane 78.

In a plane 68a of the first separator 68 which faces the electrolyte membrane-electrode structure 66, there is formed a fuel gas passage 84 which communicates between the fuel gas supply through hole 76a and the fuel gas discharge through hole 76b. For example, this fuel gas passage 84 is configured with a groove portion which extends in the arrow C direction. In a plane 68b of the first separator 68, which is opposite of the plane 68a, there is formed a cooling medium passage 86 which communicates between the cooling medium supply through hole 74a and the cooling medium discharge through hole 74b.

In a plane 70a of the second separator 70, which faces the electrolyte membrane-electrode structure 66, there is formed, for example, an oxidant gas passage 88 formed with a groove portion extending in the arrow C direction, and this oxidant gas passage 88 communicates between the oxidant gas supply through hole 72a and the oxidant gas discharge through hole 72b. In a plane 70b of the second separator 70, which is opposite of the plane 70a, there is integrally formed a cooling medium passage 86 so as to overlap with the plane 68b of the first separator 68. While not shown in the figure, in the first separator 68 and the second separator 70, there is provided a seal member as necessary.

Figure 3:
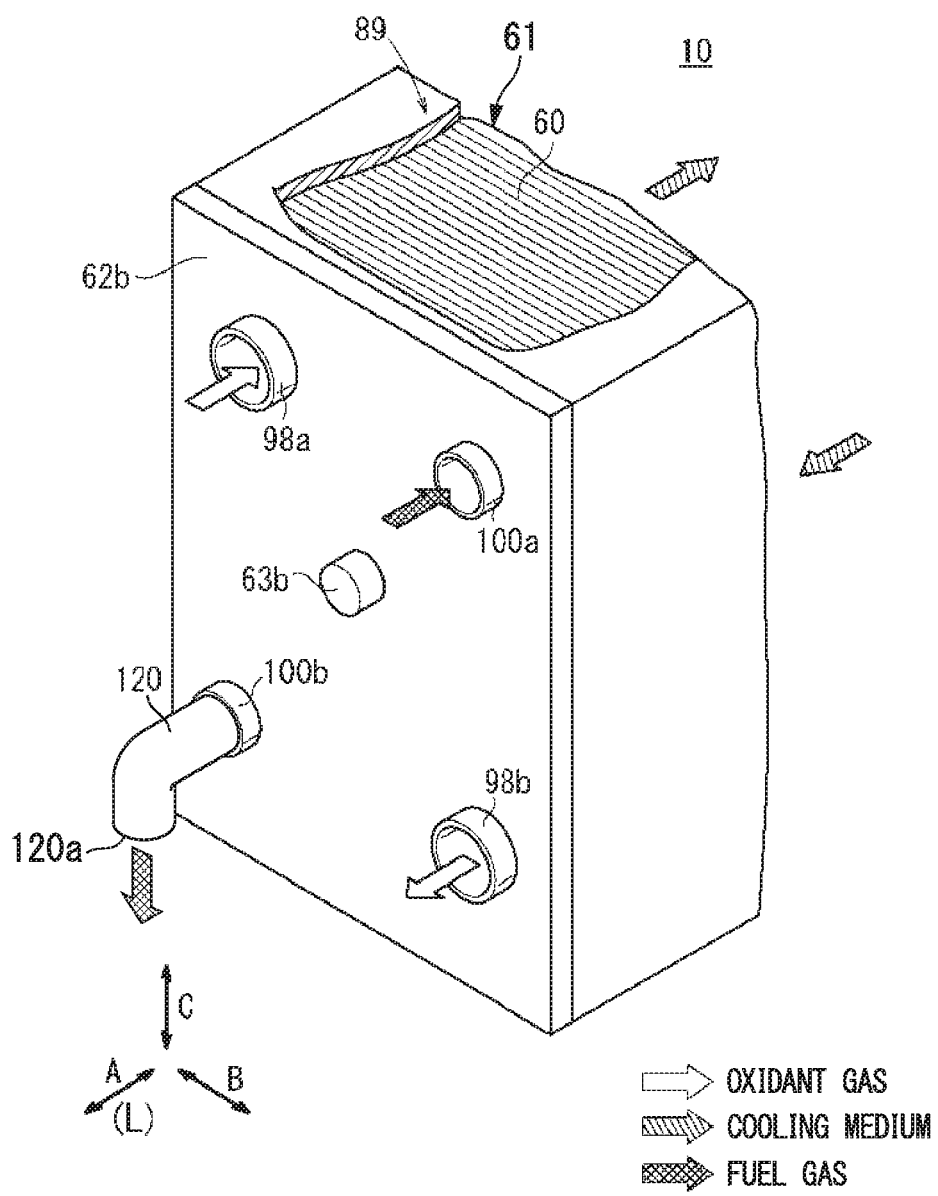
FIG. 3 is a perspective view of the fuel cell stack viewed from a humidifier side.

The fuel cell stack 10 is provided, for example, with a casing 89 shown in FIG. 3 having the end plates 62a and 62b serving as end plates thereof. Moreover, instead of the casing 89, a tie rod (not shown in the figure) may connect between the end plates 62a and 62b.

As shown in FIG. 1, in the end plate 62a there are provided; a cooling medium inlet manifold 96a, and a cooling medium outlet manifold 96b. The cooling medium inlet manifold 96a communicates with the cooling medium supply through hole 74a. On the other hand, the cooling medium outlet manifold 96b communicates with the cooling medium discharge through hole 74b. The cooling medium inlet manifold 96a and the cooling medium outlet manifold 96b communicate with the radiator 24 via the cooling medium supply pipe 28 and the cooling medium discharge pipe 30.

As shown in FIG. 3, in the end plate 62b there are provided; an oxidant gas inlet manifold 98a which communicates with the oxidant gas supply through hole 72a shown in FIG. 1, a fuel gas inlet manifold 100a which communicates with the fuel gas supply through hole 76a shown in FIG. 1, an oxidant gas outlet manifold 98b which communicates with the oxidant gas discharge through hole 72b shown in FIG. 1, and a fuel gas outlet manifold (reaction gas outlet) 100b which communicates with the fuel gas discharge through hole 76b shown in FIG. 1 and which serves as a fuel gas outlet in the end plate 62b.

Figure 4:
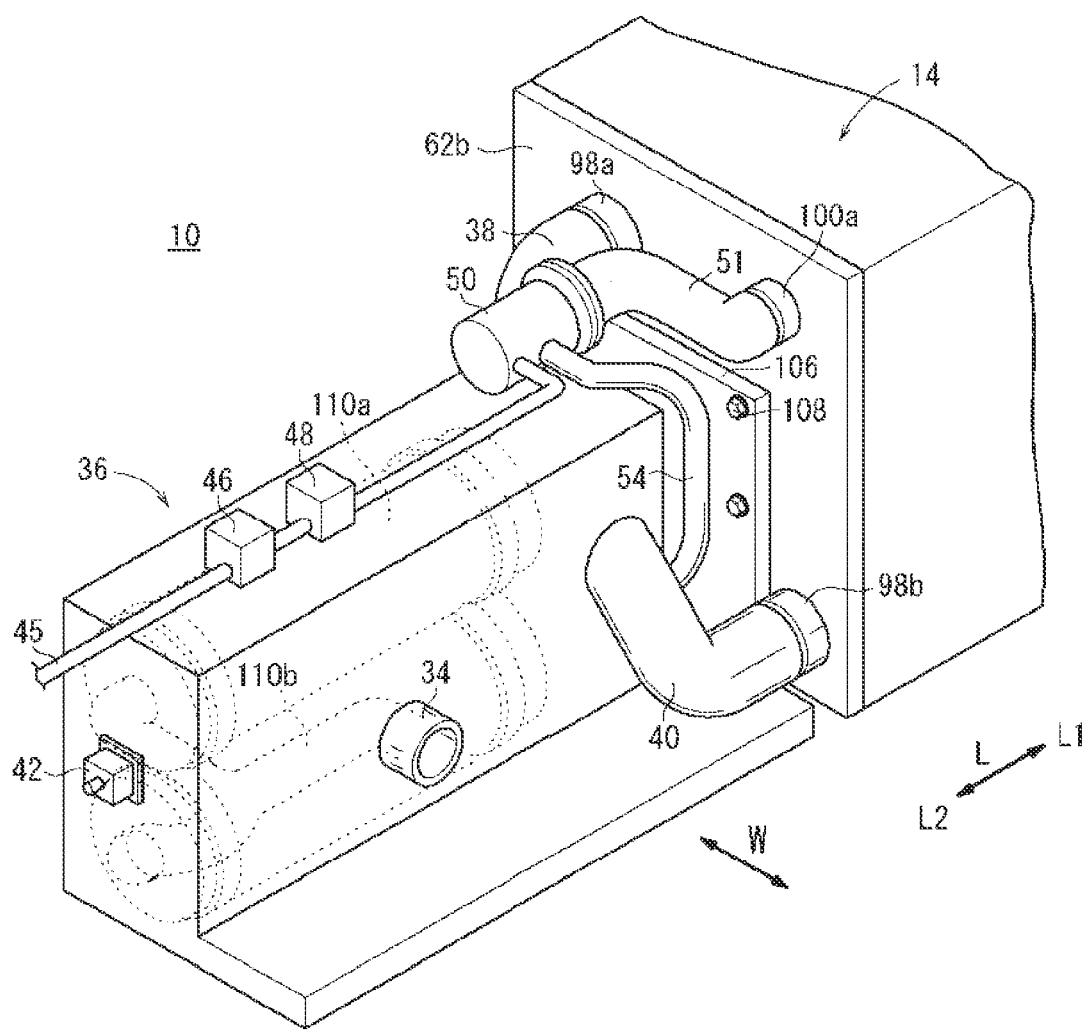
FIG. 4 is a perspective view of the humidifier and the fuel cell stack.

As shown in FIG. 4, the humidifier 36 is fixed on the end plate 62b of the fuel cell stack 10. For example, the casing of the humidifier 36 is mold-cast, and a plurality of bolts 108 are inserted in a flange portion 106 which is in contact with the end plate 62b. By means of the bolts 108 screwed on the end plate 62b, the humidifier 36 is fixed directly on the end plate 62b.

Within the humidifier 36, a first humidification portion 110a and a second humidification portion 110b are accommodated while being arranged one above the other. The first humidification portion 110a and the second humidification portion 110b are connected to the air supply pipe 34 and the humidification air supply pipe 38. For example, the first humidification portion 110a and the second humidification portion 110b may employ a hollow fiber membrane type humidification structure. In the humidifier 36 there are integrated the respective auxiliary devices that constitute the fuel gas supply mechanism 20 such as the isolation valve 46, the regulator 48, the ejector 50, and the back pressure valve 42.

Figure 5:
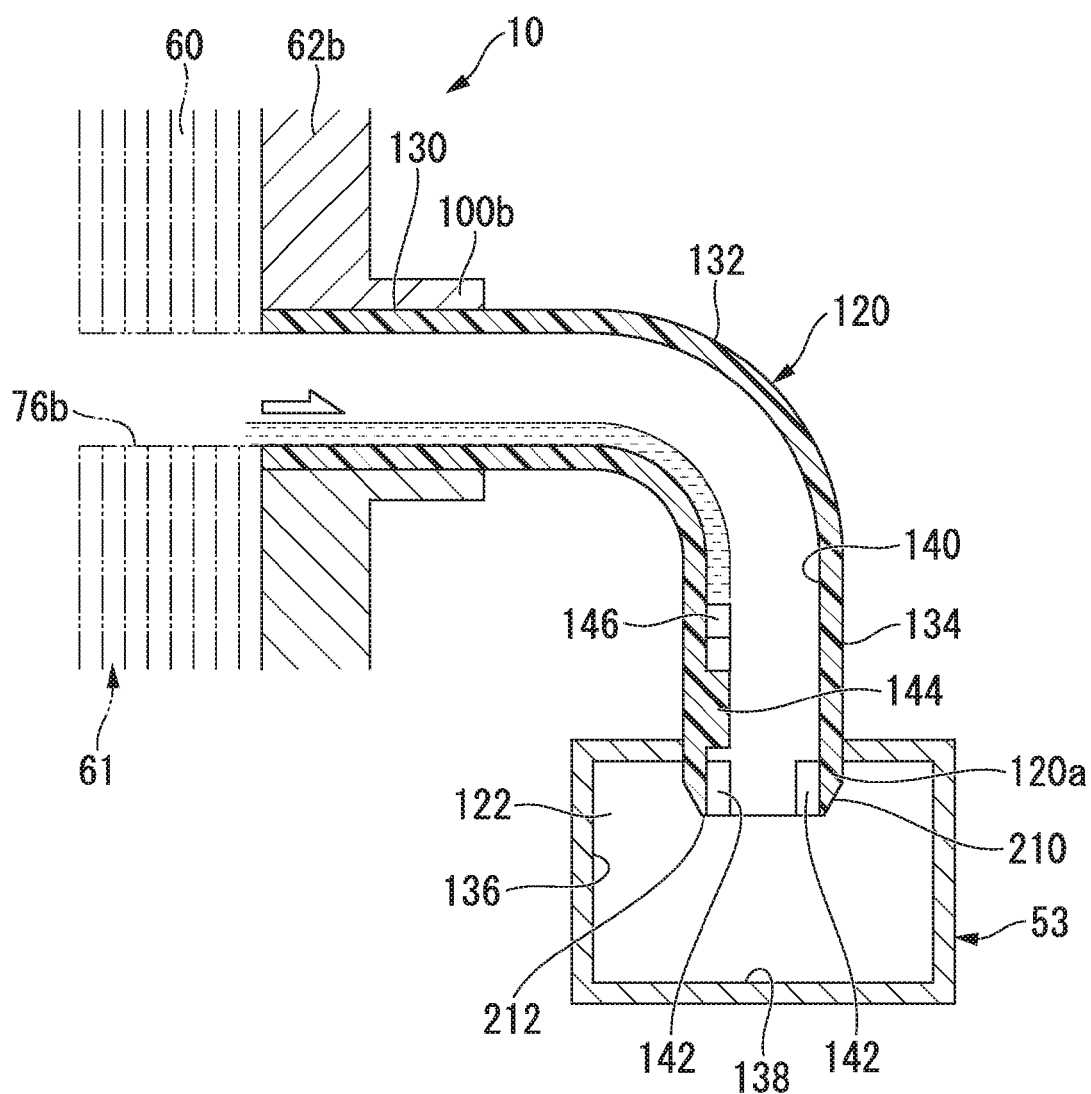
FIG. 5 is a cross sectional view of the fuel cell stack, an outlet pipe, and a catch tank.

As shown in FIG. 3 and FIG. 5, an outlet pipe 120 is connected to the fuel gas outlet manifold 100b, and a tip end portion 120a, which is the tip end of this outlet pipe 120 on the downstream side with respect to the fuel gas discharge flow direction, opens downward and is connected to the catch tank 53 as shown in FIG. 5. The catch tank 53 receives water content containing generated water (liquid) discharged together with fuel gas from the outlet pipe 120. The drainage structure of the present embodiment is configured with these outlet pipe 120 and catch tank 53.

The outlet pipe 120 has: a connection cylindrical portion 130 that is fitted on the fuel gas outlet manifold 100b in a horizontally extending attitude and that is connected to the end plate 62b; a curved cylindrical portion 132 that is on the downstream side of the connection cylindrical portion 130 with respect to the fuel gas discharge flow direction (on the opposite side of the fuel cell stack 10) and that is curved so as to be positioned lower as it goes away from the connection cylindrical portion 130; and a lower cylindrical portion 134 that is on the opposite side of the connection cylindrical portion 130 of the curved cylindrical portion 132 and that extends in the perpendicular direction, with a lower end that serves as the tip end portion 120a described above. That is to say, the outlet pipe 120 is of an L shape having a connection cylindrical portion 130, a curved cylindrical portion 132, and a lower cylindrical portion 134 in this order from the upstream side with respect to the fuel gas discharge flow direction, and it discharges fuel gas and water content containing generated water from the lower cylindrical portion 134, in the perpendicular direction (gravitational direction).

The tip end portion 120a of the lower cylindrical portion 134 of the outlet pipe 120 projects downward from above into a chamber 122 of the catch tank 53, and there is a predetermined clearance respectively from an inner side plane 136 and an inner bottom plane 138 that form the chamber 122 of the catch tank 53. In other words, the outlet pipe 120 is distanced from the inner side plane 136 and the inner bottom plane 138 of the catch tank 53. Moreover, to the catch tank 53 there are connected; a drain pipe (not shown in the figure) for discharging generated water accumulated on the inner bottom plane 138 within the chamber 122 from the inner bottom plane 138 to the outside, and the discharged fuel gas pipe 52 shown in FIG. 1 that discharges post-water collection fuel gas from the inner side plane 136.

Figure 6:
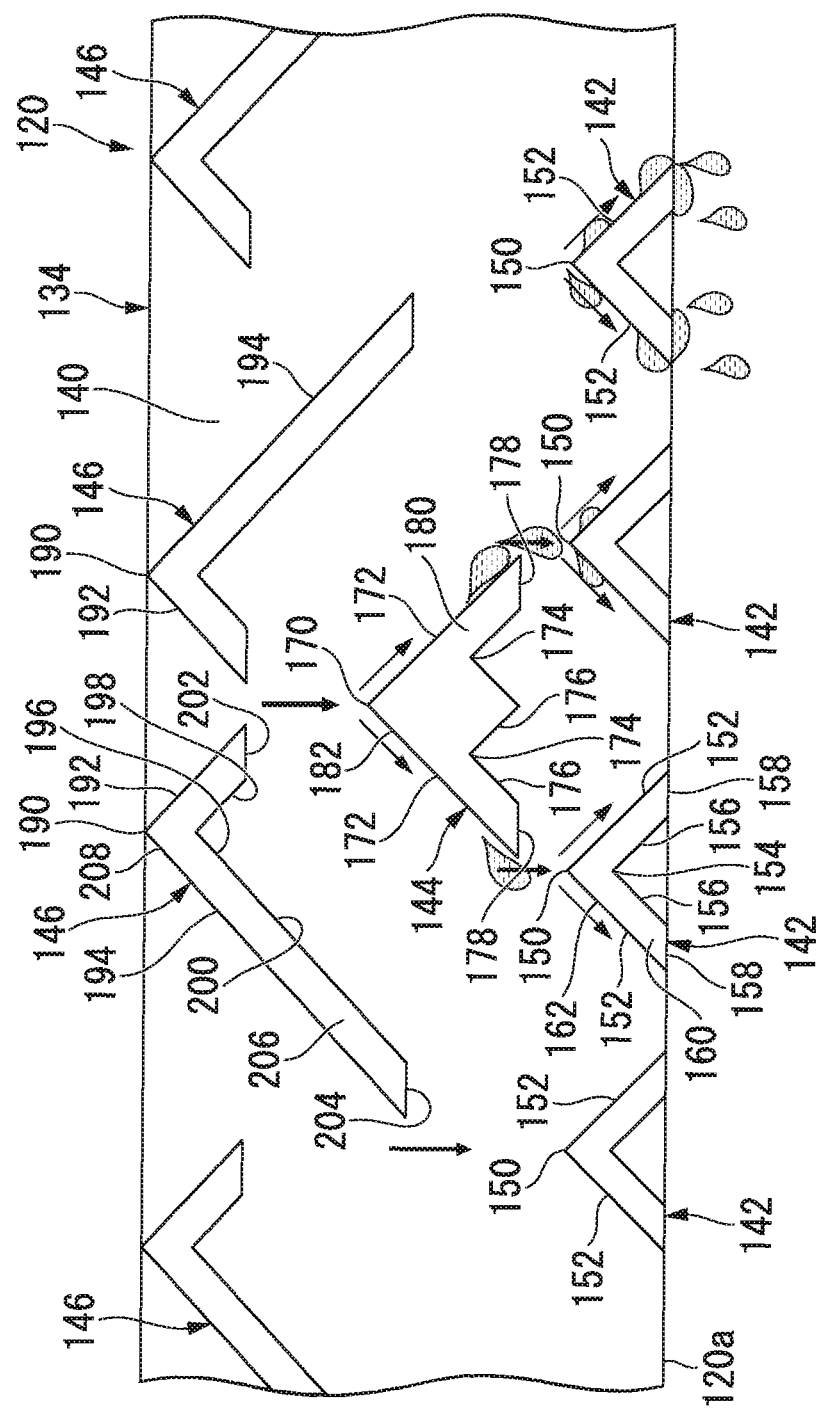
FIG. 6 is a development view of an inner circumferential plane at a position of a lower cylindrical portion of the outlet pipe.

As shown with the development view in FIG. 6, on the inner circumferential plane 140 of the outlet pipe 120 at the position of the lower cylindrical portion 134, there are formed several types (three types in the present embodiment) of umbrella-shaped protrusion portions 142, 144, and 146 that project from the inner circumferential plane 140 inward with respect to the radial direction of the lower cylindrical portion 134 (toward the near side on the figure of FIG. 6). These umbrella-shaped protrusion portions 142, 144, and 146 respectively divide generated water, which is discharged together with fuel gas, in the circumferential direction of the lower cylindrical portion 134 (left-right direction in FIG. 6), and they are arranged in several stages by types in the axial direction of the lower cylindrical portion 134 (up-down direction in FIG. 6), that is, in the direction of fuel gas discharge.

At the lower end portion of the lower cylindrical portion 134 that is the downstream end with respect to the fuel gas discharge flow direction, as a first stage, there are formed, at circumferentially equal intervals while aligning the positions with respect to the axial direction of the lower cylindrical portion 134, a plurality of the umbrella-shaped protrusion portions 142, the lengths of which with respect to the circumferential and axial directions of the lower cylindrical portion 134 are shorter than those of the other stages. The umbrella-shaped protrusion portion 142 has, at the upper end thereof, which is the upstream end with respect to the fuel gas discharge flow direction, a top edge portion 150 along the radial direction of the lower cylindrical portion 134, and it has, from this top edge portion 150 to both sides with respect to the circumferential direction of the lower cylindrical portion 134, a pair of planate inclined planes 152 that incline and extend so as to be positioned on the lower side, which is the downstream side with respect to the fuel gas discharge flow direction, with approach to the tip end side.

At the lower portion of the umbrella-shaped protrusion portion 142, which is the downstream side with respect to the fuel gas discharge flow direction, in the circumferentially center of the lower cylindrical portion 134, there is formed a cutaway portion 154 that indents upward toward the upstream side with respect to the fuel gas discharge flow direction. The cutaway portion 154 is formed by a pair of inclined planes 156, one of which is parallel with one of the pair of inclined planes 152 and the other one of which is parallel with the other one of the pair of inclined planes 152. At the lower end of the umbrella-shaped protrusion portion 142, which is the downstream side with respect to the fuel gas discharge flow direction, on both sides of the cutaway portion 154, there are provided a pair of lower end planes 158 along the direction orthogonal to the axial direction of the lower cylindrical portion 134, while aligning the positions with respect to the axial direction of the lower cylindrical portion 134. The umbrella-shaped protrusion portion 142 is such that an inner end plane 160 on the inner side with respect to the radial direction of the lower cylindrical portion 134 projects from the inner circumferential plane 140 with a constant height.

Therefore, the umbrella-shaped protrusion portion 142 is of a tapered shape toward the upstream side with respect to the fuel gas discharge flow direction, and it is of an inverted V shape in the present embodiment. The umbrella-shaped protrusion portion 142 is such that the angle between the inclined planes 152 on the upstream side with respect to the fuel gas discharge flow direction, that is, the angle of the tapered portion 162 having the inclined planes 152 is approximately 90 degrees, and it is 90 degrees in the present embodiment.

At the intermediate portion of the lower cylindrical portion 134 with respect to the fuel gas discharge flow direction, as a second stage, there is formed an umbrella-shaped protrusion portion 144, the lengths of which with respect to the circumferential and axial directions of the lower cylindrical portion 134 are greater than those of the umbrella-shaped protrusion portion 142, so as to be distanced from the umbrella-shaped protrusion portion 142 in the axial direction of the lower cylindrical portion 134. The umbrella-shaped protrusion portion 144 has, at the upper end thereof, which is the upstream end with respect to the fuel gas discharge flow direction, a top edge portion 170 along the radial direction of the lower cylindrical portion 134, and it has, from this top edge portion 170 to both sides with respect to the circumferential direction of the lower cylindrical portion 134, a pair of planate inclined planes 172 that incline and extend so as to be positioned on the lower side, which is the downstream side with respect to the fuel gas discharge flow direction, with approach to the tip end side.

Moreover, at the lower portion of the umbrella-shaped protrusion portion 144, which is the downstream side with respect to the fuel gas discharge flow direction, in the circumferentially intermediate portion of the lower cylindrical portion 134, there are formed two cutaway portions 174 that indent upward toward the upstream side with respect to the fuel gas discharge flow direction, so as to line up along the circumferential direction of the lower cylindrical portion 134. The cutaway portions 174 are both formed by a pair of inclined planes 176, one of which is parallel with one of the pair of inclined planes 172 and the other one of which is parallel with the other one of the pair of inclined planes 172. At the lower end of the umbrella-shaped protrusion portion 144, which is the downstream side with respect to the fuel gas discharge flow direction, on both of the outer sides of the cutaway portions 174, there are provided a pair of lower end planes 178 along the direction orthogonal to the axial direction of the lower cylindrical portion 134, while aligning the positions with respect to the axial direction of the lower cylindrical portion 134. The umbrella-shaped protrusion portion 144 is such that an inner end plane 180 on the inner side with respect to the radial direction of the lower cylindrical portion 134 projects from the inner circumferential plane 140 with a constant height.

Therefore, the umbrella-shaped protrusion portion 144 is also of a tapered shape toward the upstream side with respect to the fuel gas discharge flow direction. The umbrella-shaped protrusion portion 144 is also such that the angle between the inclined planes 172 on the upstream side with respect to the fuel gas discharge flow direction, that is, the angle of the tapered portion 182 having the inclined planes 172 is approximately 90 degrees, and it is 90 degrees in the present embodiment. As shown in FIG. 5, the umbrella-shaped protrusion portion 144 is formed at a position closest to the end plate 62b side with respect to the circumferential direction of the lower cylindrical portion 134. As shown in FIG. 6, with respect to the circumferential direction of the lower cylindrical portion 134, on the slightly outer side of the respective both end positions of the umbrella-shaped protrusion portion 144, there are arranged the top edge portions 150 of the two adjacent umbrella-shaped protrusion portions 142.

At the upper end portion of the lower cylindrical portion 134 that is the upstream side with respect to the fuel gas discharge flow direction, as a third stage, there are formed, at circumferential intervals while aligning the positions with respect to the axial direction of the lower cylindrical portion 134, a plurality of umbrella-shaped protrusion portions 146, the lengths of which with respect to the circumferential and axial directions of the lower cylindrical portion 134 are greater than those of the umbrella-shaped protrusion portion 144. The umbrella-shaped protrusion portion 146 has, at the upper end thereof, which is the upstream end with respect to the fuel gas discharge flow direction, a top edge portion 190 along the radial direction of the lower cylindrical portion 134, and it has, from this top edge portion 190 to both sides with respect to the circumferential direction of the lower cylindrical portion 134, planate inclined planes 192 and 194 that incline and extend so as to be positioned on the lower side, which is the downstream side with respect to the fuel gas discharge flow direction, with approach to the tip end side. One of the inclined planes 192 is shorter than the other inclined plane 194.

Moreover, at the lower portion of the umbrella-shaped protrusion portion 146, which is the downstream side with respect to the fuel gas discharge flow direction, in the circumferentially intermediate portion of the lower cylindrical portion 134, there is formed a cutaway portion 196 that indents upward toward the upstream side with respect to the fuel gas discharge flow direction. The cutaway portion 196 is formed by a short inclined plane 198 that is parallel with the short inclined plane 192, and a long inclined plane 200 that is parallel with the long inclined plane 194. On the downstream side of the umbrella-shaped protrusion portion 146 with respect to the fuel gas discharge flow direction, on both sides of the cutaway portion 196, there are provided an end plane 202 and an end plane 204 along the direction orthogonal to the axial direction of the lower cylindrical portion 134, while displacing the positions with respect to the axial direction of the lower cylindrical portion 134. The umbrella-shaped protrusion portion 146 is such that an inner end plane 206 on the inner side with respect to the radial direction of the lower cylindrical portion 134 projects from the inner circumferential plane 140 with a constant height.

Therefore, the umbrella-shaped protrusion portion 146 is also of a tapered shape toward the upstream side with respect to the fuel gas discharge flow direction. The umbrella-shaped protrusion portion 146 is also such that the angle between the inclined planes 192 and 194 on the upstream side with respect to the fuel gas discharge flow direction, that is, the angle of the tapered portion 208 having the inclined planes 192 and 194 is approximately 90 degrees, and it is 90 degrees in the present embodiment. With the top edge portion 170 of the umbrella-shaped protrusion portion 144 serving as the center, several pairs of this type of umbrella-shaped protrusion portions 146 are provided at positions at equal intervals on both sides with respect to the circumferential direction of the lower cylindrical portion 134, while each having a short inclined plane 192 arranged on the umbrella-shaped protrusion portion 144 side. With respect to the circumferential direction of the lower cylindrical portion 134, the minimum clearance between the pair of umbrella-shaped protrusion portions 146 closest to the umbrella-shaped protrusion portion 144 is shorter than the length of the umbrella-shaped protrusion portion 144. Moreover, with respect to the circumferential direction of the lower cylindrical portion 134, on the slightly outer side of the respective both end positions of these umbrella-shaped protrusion portions 146, there are arranged the top edge portions 150 of the two umbrella-shaped protrusion portions 142 that are adjacent to the respective outer sides of the two umbrella-shaped protrusion portions 142 closest to the umbrella-shaped protrusion portion 144.

In the manner described above, on the inner circumferential plane 140 within the outlet pipe 120, a plurality of the umbrella-shaped protrusion portions 142, the umbrella-shaped protrusion portion 144, and a plurality of the umbrella-shaped protrusion portions 146 are arranged in the staggered manner while displacing their positions in the circumferential direction or the axial direction of the lower cylindrical portion 134.

As shown in FIG. 5, the tip end portion 120*a* of the outlet pipe 120 is formed in a tapered shape.

That is to say, on the outer circumferential portion of the tip end portion 120*a* of the lower cylindrical portion 134, there is formed a tapered plane 210 the diameter of which becomes smaller with approach to the tip end side. Accordingly, the tip end portion 120 becomes thinner with respect to the radial direction with approach to the tip end side.

The outlet pipe 120 mentioned above is configured with an electrically insulating material (for example, a resin material such as acrylic material) or a metal member having a resin coated inner plane.

Hereunder, operations of the fuel cell system 12 configured in this manner are described.

First, as shown in FIG. 1, the air pump 32 that constitutes the oxidant gas supply mechanism 18 is driven, and external air, which is an oxidant gas, is aspired and introduced to the air supply pipe 34. This air is introduced from the air supply pipe 34 into the humidifier 36, and it travels through the first humidification portion 110*a* and the second humidification portion 110*b* to be supplied to the humidification air supply pipe 38 (refer to FIG. 4).

At this time, to the off-gas supply pipe 40 there is supplied an off-gas, which is the oxidant gas used in the reaction as described later. As a result, water content contained in the off-gas moves to the air prior to being used via a water permeable membrane (not shown in the figure) of the humidifier 36, and this air prior to being used is humidified. The humidified air travels from the humidification air supply pipe 38 through the end plate 62*b* to be supplied to the oxidant gas supply through hole 72*a* within the fuel cell stack 10.

On the other hand, in the fuel gas supply mechanism 20, while the isolation valve 46 is being operated to open, after the pressure of the fuel gas (hydrogen gas) within the fuel gas tank 44 has been lowered by the regulator 48, the fuel gas travels through the ejector 50, and through the end plate 62*b* from the fuel gas supply pipe 51. It is then introduced into the fuel gas supply through hole 76*a* within the fuel cell stack 10.

Furthermore, in the cooling medium supply mechanism 16, while the cooling medium pump 26 is being operated, the cooling medium travels through the end plate 62*a* from the cooling medium supply pipe 28, and it is then introduced into the cooling medium supply through hole 74*a* within the fuel cell stack 10.

As shown in FIG. 2, the air that is supplied to the electricity generation cell 60 within the fuel cell stack 10 is introduced from the oxidant gas supply through hole 72*a* to the oxidant gas passage 88 of the second separator 70, and it moves along the cathode side electrode 82 of the electrolyte membrane-electrode structure 66. Meanwhile, the fuel gas is introduced from the fuel gas supply through hole 76*a* into the fuel gas passage 84 of the first separator 68, and it moves along the anode side electrode 80 of the electrolyte membrane-electrode structure 66.

As a result, in each electrolyte membrane-electrode structure 66, the oxygen within the air supplied to the cathode side electrode 82, and the fuel gas (hydrogen) supplied to the anode side electrode 80 are consumed in an electrochemical reaction within an electrode catalyst layer, and thereby electric power generation is performed.

Next, the air that has been supplied to and consumed at the cathode side electrode 82 flows along the oxidant gas discharge through hole 72*b*, and it is then discharged as an off-gas from the end plate 62*b* to the off-gas supply pipe 40 (refer to FIG. 1).

Similarly, the fuel gas that has been supplied to and consumed at the anode side electrode 80 is discharged to and flows through the fuel gas discharge through hole 76*b*, and it then travels as a discharged fuel gas from the end plate 62*b* through the catch tank 53 to be discharged to the discharged fuel gas pipe 52 (refer to FIG. 1). Some of the discharged fuel gas that has been discharged to the discharged fuel gas pipe 52 travels through the return pipe 54, and returns to the fuel gas supply pipe 51 while the aspiration of the ejector 50 is being operated.

The discharged fuel gas is mixed with new fuel gas and is supplied into the fuel cell stack 10 from the fuel gas supply pipe 51. The remainder of the discharged fuel gas is discharged while the purge valve 56 is being operated to open.

Here, at the anode side electrode 80, generated water is back-diffused, and this generated water together with the fuel gas are discharged to the fuel gas discharge through hole 76*b*. As shown in FIG. 5, in the fuel gas discharge through hole 76, the generated water introduced to the end plate 62*b* side travels through the outlet pipe 120 along the flow path of the discharged fuel gas, and it is sent to the catch tank 53. As a result, the generated water drips from the tip end portion 120*a* of the outlet pipe 120 into the catch tank 53, and it is accumulated (collected) within the chamber 122 of the catch tank 53.

When flowing through the outlet pipe 120, the generated water basically travels through the lower portion of the connection cylindrical portion 130, and therefore, most of it flows on the inner circumferential plane 140 toward the pair of umbrella-shaped protrusion portions 146 closest to the umbrella-shaped protrusion portion 144 shown in FIG. 6, at the position of the lower cylindrical portion 134. The generated water that has flowed on the inner circumferential plane 140 and to the umbrella-shaped protrusion portions 146 is divided by each of the top edge portions 190 while traveling on the inclined plane 140, and then, for example, some of it flows on the opposing short inclined planes 192 while traveling on the inner circumferential plane 140. Then, the generated water hits the top edge portion 170 of the umbrella-shaped protrusion portion 144 and it is divided in the circumferential direction of the lower cylindrical portion 134 to flow on the inclined planes 172 respectively. The generated water flowing on the inclined plane 172 then, while traveling on the inner circumferential plane 140, hits the top edge portion 150 of the umbrella-shaped protrusion portion 142 to be divided to both sides with respect to the circumferential direction of the lower cylindrical portion 134, and flows on the inclined planes 152 respectively. Then, the generated water is discharged perpendicularly downward from the tip end portion 120*a*.

Moreover, some of the remaining generated water flows on the long inclined plane 194 of the umbrella-shaped protrusion portion 146 while traveling on the inner circumferential plane 140, and hits the top edge portion 150 of the umbrella-shaped protrusion portion 142, the position of which with respect to the circumferential direction of the lower cylindrical portion 134 is near the lower end portion of the long inclined plane 194, to be divided into circumferentially both sides of the lower cylindrical portion 134. After flowing on the inclined planes 152 respectively, it is discharged perpendicularly downward from the tip end portion 120a. The generated water that hits the top edge portion 150 of another umbrella-shaped protrusion portion 142 is also divided into both sides with respect to the circumferential direction of the lower cylindrical portion 134 while traveling on the inner circumferential plane 140. After flowing on the inclined planes 152 respectively, it is discharged perpendicularly downward from the tip end portion 120a.

As described above, the umbrella-shaped protrusion portions 142, 144, and 146 arranged in the staggered manner divide generated water discharged together with the fuel gas from the outlet pipe 120 with respect to the circumferential direction of the lower cylindrical portion 134, and it is then discharged from the tip end portion 120a. As a result, for example, even if an amount of generated water that can flow as a continuous flow flows through the outlet pipe 120, the water amount of each of the divided flows is reduced by dividing it into several flows and diffusing it with respect to the circumferential direction of the lower cylindrical portion 134. As a result, each flow will not have an amount that can flow as a continuous flow and it will be separated from each other. That is to say, the umbrella-shaped protrusion portions 142, 144, and 146 separate a continuous flow of generated water that is discharged together with fuel gas.

The length of the cutaway portion 154 of the umbrella-shaped protrusion portion 142 with respect to the circumferential direction 134 is set based on the generated amount of generated water so that flows of generated water divided by the pair of inclined planes 152 will not re-merge at positions of the lower end planes 158 of the umbrella-shaped protrusion portion 142. Moreover, the clearance between the umbrella-shaped protrusion portions 142 adjacent to each other with respect to the circumferential direction of the lower cylindrical portion 134 is set based on the generated amount of generated water so that flows of generated water flowing respectively on the opposing inclined planes 152 will not merge.

As shown in FIG. 2, after having been introduced from the cooling medium supply through hole 74a into the cooling medium passage 86 between the first separator 68 and the second separator 70, the cooling medium flows along the arrow B direction. After having cooled the electrolyte membrane-electrode structure 66, this cooling medium moves through the cooling medium discharge through hole 74b and is discharged to the cooling medium discharge pipe 30 from the cooling medium outlet manifold 96b of the end plate 62 shown in FIG. 1. This cooling medium, after having been cooled by the radiator 24, is supplied to the fuel cell stack 10 from the cooling medium supply pipe 28 while the cooling medium pump 26 is being operated.

According to the present embodiment described above, the umbrella-shaped protrusion portions 142, 144, and 146 of the shape tapered toward the upstream side with respect to the fuel gas discharge flow direction, that are provided in the outlet pipe 120 divide a continuous flow of generated water discharged together with the fuel gas, and in addition, the tip end portion 120a of the outlet pipe 120 opens downward. As a result, the divided generated water can be stably discharged downward regardless of the flow rate of fuel gas. Accordingly, without increasing the distance between the tip end portion 120a of the outlet pipe 120 that projects into the catch tank 53 and the inner side plane 136 and the inner bottom plane 138 of the catch tank 53, it is possible to prevent electrical short circuit via generated water between the electricity generation cell 60, which is the electrical activation unit of the fuel cell stack 10, and the catch tank 53, which is an external low electrical resistance member and which electrically serves as ground. Therefore, it is possible to suppress an increase in the size of the catch tank 53. In addition, since the umbrella-shaped protrusion portions 142, 144, and 146 within the outlet pipe 120 divide a continuous flow of generated water, the configuration for dividing a continuous flow of generated water will not become large. As a result, while preventing the configuration from becoming large, it is possible to prevent conductive paths from being formed by generated water discharged from the fuel cell stack 10, between the electricity generation cell 60 of the fuel cell stack 10 and the catch tank 53.

Moreover, since a plurality of the umbrella-shaped protrusion portions 142, 144, and 146 are arranged in a staggered manner within the outlet pipe 120, it is possible to divide a large amount of generated water that is discharged together with fuel gas, and it is possible to divide generated water continuous flow in a satisfactory manner. Therefore, it is possible to further prevent the electricity generation cell 60 of the fuel cell stack 10 and the catch tank 53 from being short circuited via generated water discharged from the fuel cell stack 10.

Furthermore, since the angle of the tapered portions 162, 182, and 208 of the umbrella-shaped protrusion portions 142, 144, and 146 on the upstream side with respect to the fuel gas discharge flow direction is approximately 90 degrees, it is possible to suppress generated water discharged from the fuel cell stack 10 from over flowing and crossing over the umbrella-shaped protrusions 142, 144, and 146 toward the radially inner side of the lower cylindrical portion 134, and thus perform flow division in a satisfactory manner. Moreover, it is also possible to suppress the divided generated water from re-merging after crossing over the umbrella-shaped protrusion portions 142, 144, and 146 toward the downstream side with respect to the fuel gas discharge flow direction. Therefore, it is possible to further prevent the electricity generation cell 60 of the fuel cell stack 10 and the catch tank 53 from being short circuited via generated water discharged from the fuel cell stack 10.

Water column division (sectional division) causes surface energy to increase, and therefore, it would not naturally occur unless an external force is applied. Accordingly, here is considered flow division caused by moving liquid drops colliding with the tapered portions 162, 182, and 208 of the umbrella-shaped protrusion portions 142, 144, and 146, and rupturing as a result. Observing a comparison of the angle of the tapered portions 162, 182, and 208 between an acute angle side (for when the angle is an acute angle) and an obtuse angle side (for when the angle is an obtuse angle), the acute angle side is more likely to divide a flow of liquid droplets flowing on the inner circumferential plane 140 and the obtuse angle side is less likely to divide the flow. Moreover, the level of reduction in the vertical vector of the flow rate of liquid droplets flowing on the inner circumferential plane 140 is low on the acute angle side and high on the obtuse angle side. Therefore, on the acute angle side there is no risk of liquid droplets over flowing on the inner end planes 160, 180, and 206, but on the obtuse angle side there is a risk of over flowing. On the other hand, since the length of the lower end portion with respect to the horizontal direction is short on the acute angle side and long on the obtuse angle side, re-merging of liquid droplets at the lower end portion after flow division is more likely to occur on the acute angle side and less likely to occur on the obtuse angle side. Taking this reason into consideration, the angle of the tapered portions 162, 182, and 208 is made approximately 90 degrees.

That is to say, provided that the angle of the tapered portions 162, 182, and 208 is approximately 90 degrees, the performance of liquid droplets division, the level of over flow suppression, and the level of re-merging suppression all achieve a superior level. In contrast, if the angle is approximately 60 degrees, which is a more acute angle, while the performance of liquid droplet flow division and the level of over flow suppression are excellent, the level of re-merging suppression is not very desirable. Moreover, if the angle is approximately 120 degrees, which is a more obtuse angle, while the level of re-merging suppression is superior, the performance of liquid droplet flow division is not very desirable and the level of over flow suppression is even lower. Therefore, the angle of the tapered portions 162, 182, and 208 is made approximately 90 degrees.

In addition, since the cutaway portions 154, 174, and 196 are provided at all of the lower end portions of the umbrella-shaped protrusion portions 142, 144, and 146, the level of re-merging suppression becomes even higher. In other words, in order to simply increase the level of re-merging suppression, the length of the lower end portions of the umbrella-shaped protrusion portions 142, 144, and 146 in the lower cylindrical portion 134 with respect to the circumferential direction (horizontal direction) may be increased. However, if this length is increased, the length of the lower cylindrical portion 134 with respect to the axial direction (vertical direction) is also increased, and the size of the outlet pipe 120 becomes greater, and this is not preferable. Since liquid droplets would not return to the desired height due to the surface tension and gravity, it is possible to increase the level of re-merging suppression without increasing the length of the lower end portions of the umbrella-shaped protrusion portions 142, 144, and 146, by providing the cutaway portions 154, 174, and 196 in all of the lower end portions of the umbrella-shaped protrusion portions 142, 144, and 146.

Since the tip end portion 120a of the outlet pipe 120 is formed in a tapered shape, it is possible to suppress generated water discharged from the fuel cell stack 10 from merging at the position of this tip end portion 120a and becoming a continuous flow again. Therefore, it is possible to further prevent the electricity generation cell 60 of the fuel cell stack 10 and the catch tank 53 from being short circuited via generated water discharged from the fuel cell stack 10.

That is to say, in a case where the tip end portion 120a is of a straight shape rather than the tapered shape, if the surface texture is hydrophilic (30 degrees), water travels on the lower end plane 212 of the tip end portion 120a, and it is unlikely to fall perpendicularly downward and is likely to merge. As a result, the amount of water for a single water flow is likely to increase. On the other hand, if the surface texture is water-shedding (130 degrees), water is more likely to drain but less likely to drop perpendicularly downward. In contrast, if a tapered plane 210 is formed on the tip end portion 120a of the outlet pipe 120, for example, by means of 45-degree chamfering, then even in the case where the surface texture is either hydrophilic (30 degrees) or water shedding (130 degrees), the situation occurring with the straight shape where water traveling on the lower end plane 212 merges is less likely to occur, and in addition, it now allows water to fall perpendicularly downward.

Figure 7:
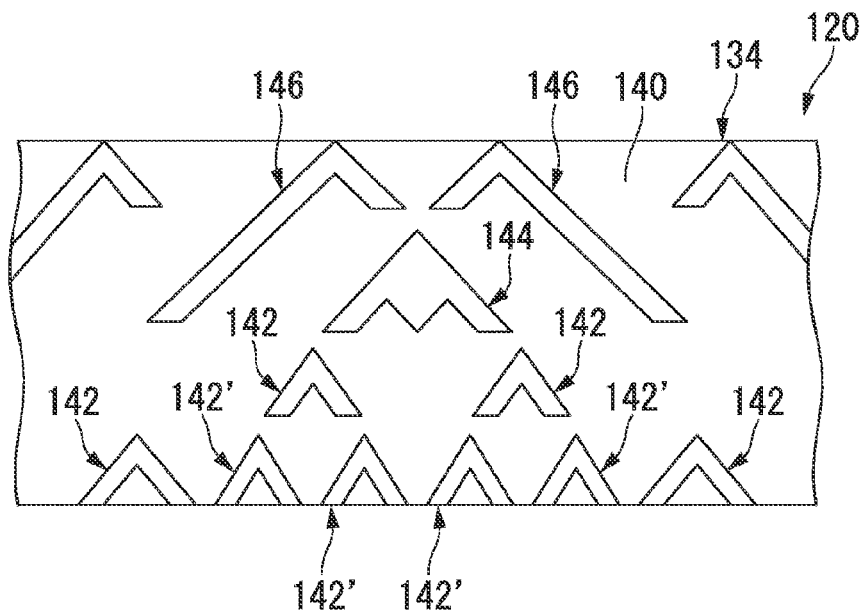
FIG. 7 is a development view showing one example of a modified example of the inner circumferential plane at the position of the lower cylindrical portion of the outlet pipe.

The staggering arrangement of the umbrella-shaped protrusion portions 142, 144, and 146 described above is merely an example, and various modifications may be made to the arrangement. For example, as shown in FIG. 7, the umbrella-shaped protrusion portion 144 and two umbrella-shaped protrusion portions 142 closest to the umbrella-shaped protrusion portion 144 are displaced upward, and at the positions where these two umbrella-shaped protrusion portions 142 were originally present, there are arranged four umbrella-shaped protrusion portions 142' that are of a shape similar to that of the umbrella-shaped protrusion portion 142 and that have a width with respect to the circumferential direction of the lower cylindrical portion 134 narrower than that of the umbrella-shaped protrusion portion 142. In this manner, the umbrella-shaped protrusion portions 142', 142, 144, and 146, and the number of stages thereof can be increased, and it is possible to increase the number of divided flows of generated water.

Figure 8:
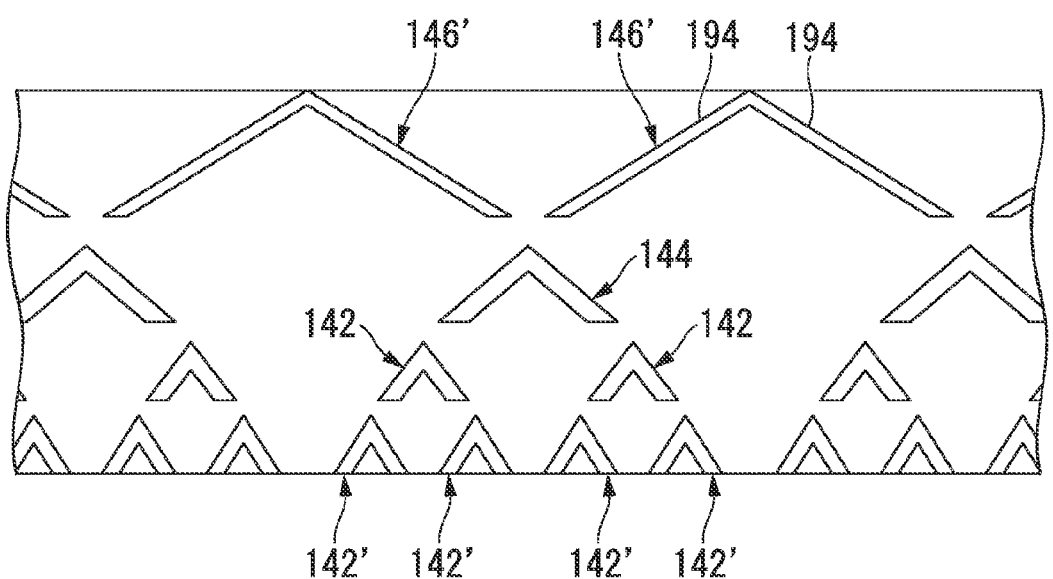
FIG. 8 is a development view showing one example of a modified example of the inner circumferential plane at the position of the lower cylindrical portion of the outlet pipe.

Moreover, as shown in FIG. 8, the combination of the umbrella-shaped protrusion portion 144, the two umbrella-shaped protrusion portions 142, and the four umbrella-shaped protrusion portions 142' shown in FIG. 7 may be provided in several locations at intervals with respect to the circumferential direction of the lower cylindrical portion 134. Further, between the umbrella-shaped protrusion portions 144 adjacent to each other in the circumferential direction of the lower cylindrical portion 134, there may be arranged an umbrella-shaped protrusion portion 146' that has been modified from the umbrella-shaped protrusion portion 146 so as to have two long inclined planes 194.

Also, the shape of the umbrella-shaped protrusion portion 142 and the structure of the inner circumferential plane 140 are merely an example, and various modifications may be made thereto.

Figure 9:
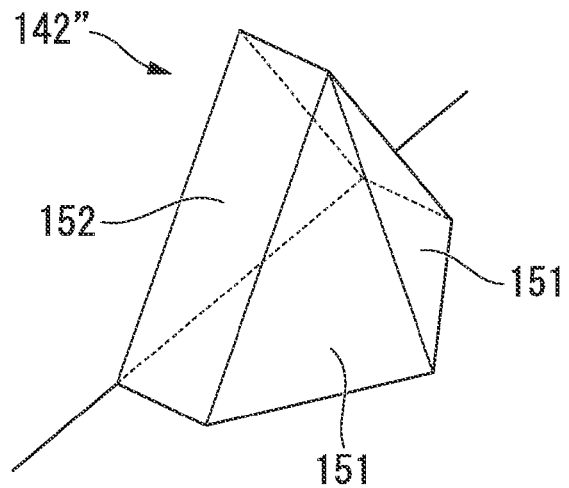
FIG. 9 is a perspective view of a modified example of an umbrella-shaped protrusion portion 142.

For example, as shown in FIG. 9, as a modified example of the umbrella-shaped protrusion portion 142, there may be employed an umbrella-shaped protrusion portion 142" that is formed in a shape of protrusion toward the upstream direction of the outlet pipe 120, and that has a pair of second inclined planes 151 so as to be formed in a shape of a protrusion (mountain shape) toward the radially inner side of the outlet pipe 120.

Figure 10:
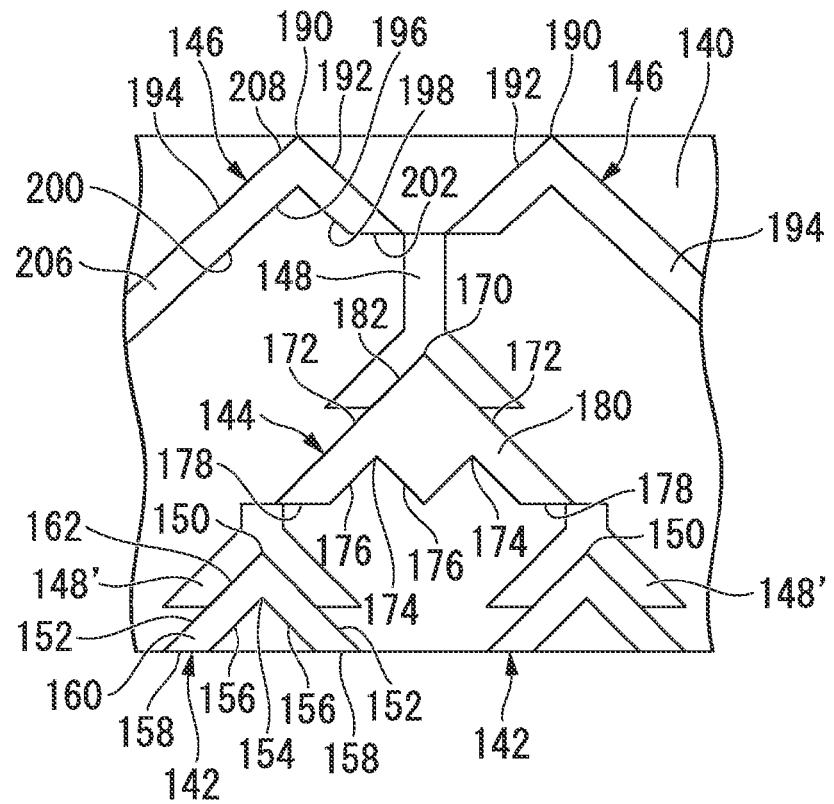
FIG. 10 is a partially enlarged view showing one example of a modified example of the inner circumferential plane at the position of the lower cylindrical portion of the outlet pipe.

Moreover, for example, between the upstream side umbrella-shaped protrusion portion (for example, the umbrella-shaped protrusion portion 146) and the downstream side umbrella-shaped protrusion portion (for example, the umbrella-shaped protrusion portion 144) arranged in the staggered manner as shown in FIG. 6, there may be provided a discharged liquid guide portion 148 having a wall portion along the substantially radial direction of the outlet pipe 120 as shown in FIG. 10.

Figure 11A:
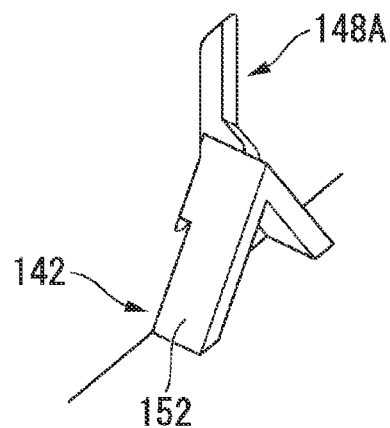
FIG. 11A is a perspective view showing an example of a discharged liquid guide portion 148 in FIG. 10.
Figure 11B:
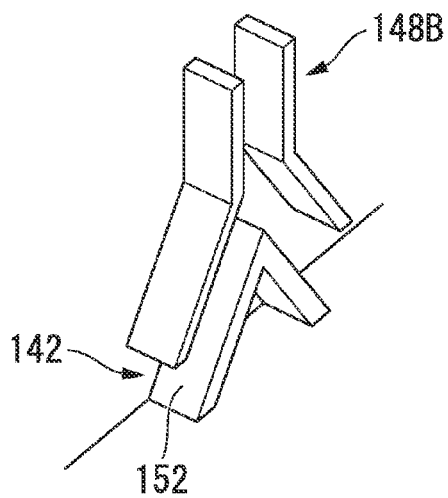
FIG. 11B is a perspective view showing an example of the discharged liquid guide portion 148 in FIG. 10.
Figure 11C:
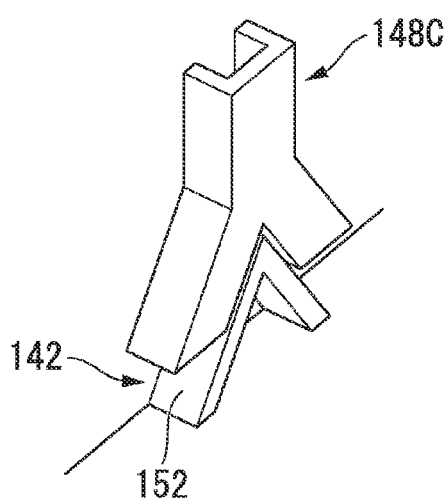
FIG. 11C is a perspective view showing an example of the discharged liquid guide portion 148 in FIG. 10.

As the wall portion of the discharged liquid guide portion 148, for example, a groove 148A shown in FIG. 11A, a guide rail portion 148B shown in FIG. 11B, or a cover 148C shown in FIG. 11C may be employed.

Figure 12:
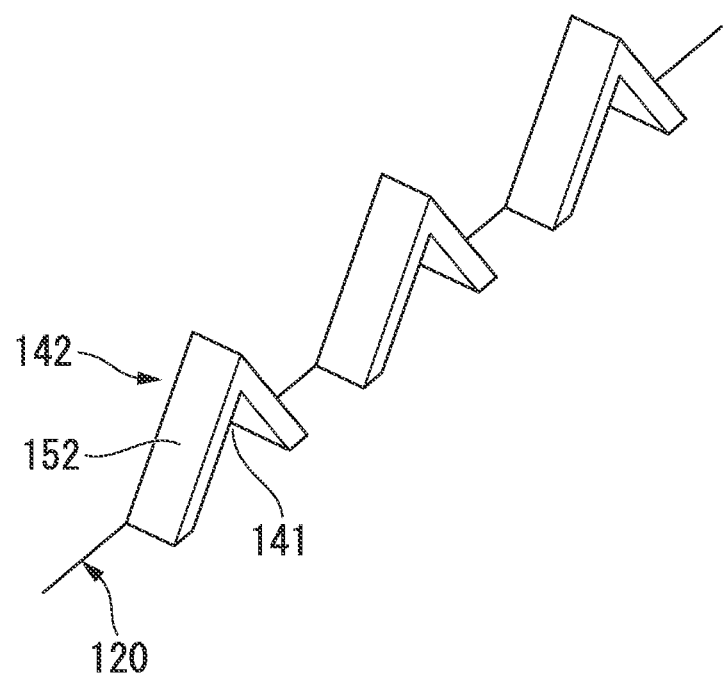
FIG. 12 is a perspective view showing one example of a modified example of a lower end of the lower cylindrical portion of the outlet pipe.

Furthermore, for example, as shown in FIG. 12, the portion of the opening portion of the outlet pipe 120, with which the lower end of the umbrella-shaped protrusion portion 142 is in contact, between one lower end and the other lower end of the umbrella-shaped protrusion portion 142 may configure a cutaway portion 141, which is cut away and formed toward the tapered portion of the umbrella-shaped protrusion portion 142.

Figure 13A:
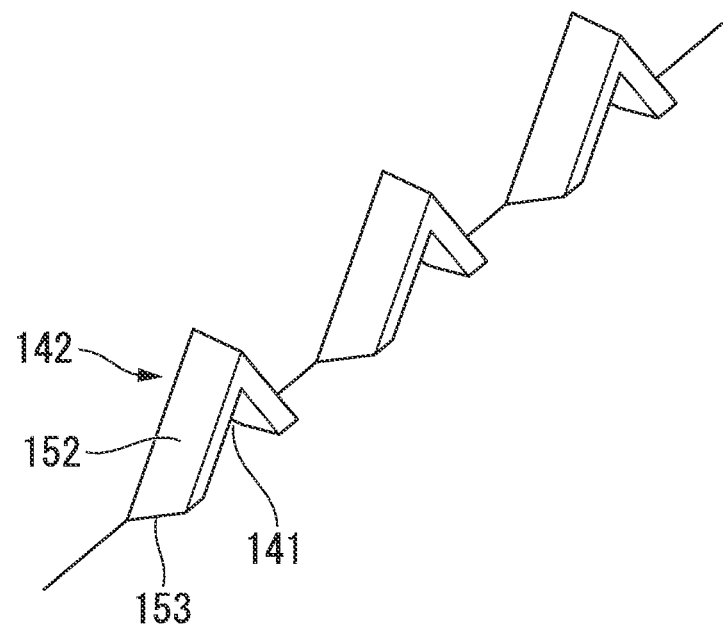
FIG. 13A is a perspective view showing one example of a modified example of the lower end of the lower cylindrical portion of the outlet pipe.
Figure 13B:
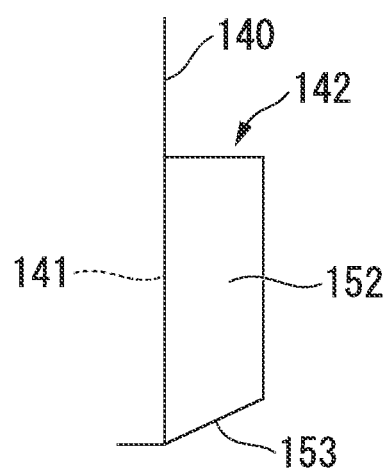
FIG. 13B is a side view of FIG. 13A.

Moreover, for example, as shown in FIG. 13A and FIG. 13B, the lower end of the umbrella-shaped protrusion portion 142 may have an inclined plane 153 that inclines with respect to the radial direction of the outlet pipe 120.

Furthermore, these shapes may be appropriately combined.

In this manner, it is possible to divide a flow of liquid discharged together with a reaction gas or to stop the divided flows from re-merging. As a result, a continuous flow of a liquid can be divided at a better level.

In the embodiment above, in a fuel cell stack to be mounted on a vehicle, acceleration/deceleration of the vehicle, changes in fuel cell stack operating conditions, and changes in fuel gas flow rate due to this are severe. Therefore, there is a possibility that generated water discharged together with fuel gas may flow at all positions in the circumferential direction of the lower cylindrical portion 134 of the outlet pipe 120. Accordingly, the umbrella-shaped protrusion portions 142, 144, and 146 that divide a continuous flow of generated water are arranged on the entire circumference of the lower cylindrical portion 134. Furthermore, in a stationary fuel cell stack, operating conditions and changes in fuel gas flow rate due to this are stable. Accordingly, in the case where generated water flows at a constant position with respect to the circumferential direction of the lower cylindrical portion 134 of the outlet pipe 120, the umbrella-shaped protrusion portions 142, 144, and 146 may be provided only at this position. Moreover, only one umbrella-shaped protrusion portion may be provided, depending on the flow rate of generated water. That is to say, there may be provided at least one umbrella-shaped protrusion portion for dividing a continuous flow of generated water.

Furthermore, in the embodiment above, there has been described as an example, the case where the tip end portion 120a of the outlet pipe 120 opens perpendicularly downward. However, it may open in a direction diagonal to the perpendicular direction as long as it is an angle that approximates to the perpendicular angle.

Also, in the embodiment above, there has been described as an example where the outlet pipe 120 connected to the fuel gas outlet manifold 100b communicates with the fuel gas discharge through hole 76b. However, it is not limited to this. For example, an outlet pipe and a catch tank similar to those described above may be provided between the off-gas supply pipe 40 and the oxidant gas outlet manifold 98b that communicates with the oxidant gas discharge through hole 72b, and the above configuration may be applied to this outlet pipe.

DESCRIPTION OF REFERENCE SYMBOLS

10 Fuel cell stack
53 Catch tank
60 Electricity generation cell
61 Laminated body
62b End plate
76b Fuel gas discharge through hole (reaction gas discharge through hole)
100b Fuel gas outlet manifold (reaction gas outlet)
120 Outlet pipe
120a Tip end portion
136 Inner side plane
138 Inner bottom plane
142, 142', 144, 146, 146' Umbrella-shaped protrusion portion
162, 182, 208 Tapered portion

The invention claimed is:

1. A drainage structure for a gas outlet region in a fuel cell stack, the fuel cell stack comprising:
    a laminated body in which a plurality of electricity generation cells are laminated, and that is provided with a reaction gas discharge through hole which discharges a reaction gas used in an electricity generation reaction in the electricity generation cells; and
    an end plate arranged at one end in the lamination direction of the laminated body and provided with a reaction gas outlet which communicates with the reaction gas discharge through hole, wherein there is provided;
    an outlet pipe coupled to the reaction gas outlet, with a tip end portion of the outlet pipe on a downstream side in a reaction gas discharge flow direction opening downward, and
    at least one umbrella-shaped protrusion portion within the outlet pipe, the protrusion portion having a shape which tapers toward an upstream side with respect to the reaction gas discharge flow direction, thereby dividing a continuous flow of the discharged liquid as well as the reaction gas.

2. The drainage structure for a gas outlet region in a fuel cell stack according to claim 1, wherein a plurality of the umbrella-shaped protrusion portions are arranged in a staggered manner within the outlet pipe.

3. The drainage structure for a gas outlet region in a fuel cell stack according to claim 2, wherein the umbrella-shaped protrusion portions are formed in a shape which protrudes in an upstream direction of the outlet pipe, and are formed in a shape which protrudes toward a radially inner side of the outlet pipe.

4. A drainage structure for a gas outlet region in a fuel cell stack according to claim 2, wherein
    between upstream side umbrella-shaped protrusion portions and downstream side umbrella-shaped protrusion portions, which are arranged in the staggered manner, there is provided a discharged liquid guide portion which has a wall portion along a substantially radial direction of the outlet pipe.

5. The drainage structure for a gas outlet region in a fuel cell stack according to claim 2, wherein a portion of an opening portion of the outlet pipe, with which a lower end of the umbrella-shaped protrusion portion is in contact, between one lower end and another lower end of the umbrella-shaped protrusion portion, is formed in a manner of being a cutaway toward the tapered portion of the umbrella-shaped protrusion portion.

6. The drainage structure for a gas outlet region in a fuel cell stack according to claim 2, wherein a lower end of the umbrella-shaped protrusion portion is inclined with respect to a radial direction of the outlet pipe.

7. The drainage structure for a gas outlet region in a fuel cell stack according to claim 1, wherein there is provided a catch tank which receives liquid discharged from the outlet pipe, the outlet pipe has the tip end portion projecting within the catch tank, and a predetermined clearance is provided respectively from an inner side plane and an inner bottom plane of the catch tank.

8. The drainage structure for a gas outlet region in a fuel cell stack according to claim 1, wherein the umbrella-shaped protrusion portion is such that an angle of a tapered portion on the upstream side with respect to the reaction gas discharge flow direction is approximately 90 degrees.

9. The drainage structure for a gas outlet region in a fuel cell stack according to claim 1, wherein the tip end portion of the outlet pipe is formed in a tapered shape.

* * * * *